(12) United States Patent
Van de Vosse et al.

(10) Patent No.: US 8,382,081 B2
(45) Date of Patent: Feb. 26, 2013

(54) METHOD FOR MACHINING A WORKPIECE AS WELL AS SUCH MACHINING DEVICE

(75) Inventors: Gerhardus Van de Vosse, Deventer (NL); Willem Frederik Gerrit Jan Lenselink, Oldenzaal (NL)

(73) Assignee: Auto-Cell B.V. (NL)

( * ) Notice: Subject to any disclaimer, the term of this patent is extended or adjusted under 35 U.S.C. 154(b) by 68 days.

(21) Appl. No.: 12/887,284

(22) Filed: Sep. 21, 2010

(65) Prior Publication Data

US 2012/0068393 A1  Mar. 22, 2012

(51) Int. Cl.
| | |
|---|---|
| *B25B 3/00* | (2006.01) |
| *B25B 1/00* | (2006.01) |
| *B25B 1/22* | (2006.01) |
| *B23Q 3/00* | (2006.01) |
| *B23Q 7/00* | (2006.01) |
| *B23Q 17/00* | (2006.01) |
| *B23Q 39/04* | (2006.01) |
| *B23Q 41/02* | (2006.01) |

(52) U.S. Cl. .............. 269/9; 269/1; 269/71; 29/563
(58) Field of Classification Search ............ 269/9, 1, 269/71, 303, 25, 88; 29/563, 564.8
See application file for complete search history.

(56) References Cited

U.S. PATENT DOCUMENTS

| | | | | |
|---|---|---|---|---|
| 4,968,012 | A * | 11/1990 | Haddad et al. | 269/88 |
| 5,582,397 | A | 12/1996 | Lanvin | |
| 6,986,194 | B2 * | 1/2006 | Lanvin | 29/563 |
| 6,993,821 | B2 * | 2/2006 | Ahti et al. | 29/563 |
| 7,146,705 | B2 * | 12/2006 | Ahti et al. | 29/563 |
| 7,156,384 | B1 * | 1/2007 | Varnau | 269/25 |

FOREIGN PATENT DOCUMENTS

| | | |
|---|---|---|
| EP | 1413390 | 4/2004 |
| EP | 1752253 | 2/2007 |

OTHER PUBLICATIONS

International Search Report dated Sep. 30, 2009, for NL1036781.

* cited by examiner

*Primary Examiner* — Lee D Wilson
*Assistant Examiner* — Alvin Grant
(74) *Attorney, Agent, or Firm* — Barnes & Thornburg LLP

(57) ABSTRACT

For machining a workpiece the workpiece is fixed in a first gripping device of a machining device in order to make at least one element. Next the workpiece is transferred to the second gripping device of the machining device, where the workpiece is fixed by means of the element in the second gripping device of the machining device, while the first gripping device remains connected to the machining device. The element comprises a dovetail-shaped mounting element.

16 Claims, 9 Drawing Sheets

METHOD FOR MACHINING A WORKPIECE AS WELL AS SUCH MACHINING DEVICE

DESCRIPTION

The invention relates to a method for machining a workpiece, wherein the workpiece is fixed in a first gripping device of a machining device, in order to make at least one element, after which the workpiece is transferred to a second gripping device of the machining device, where by means of the element the workpiece is fixed in the second gripping device of the machining device, while the first gripping device remains connected to the machining device.

The invention also relates to a machining device for machining a workpiece, which machining device is provided with at least a first gripping device that is suited for fixing the workpiece to be provided with an element, which machining device is further provided with a second gripping device that is suited for fixing the workpiece by means of the element.

In such method, known from U.S. Pat. No. 5,582,297, the workpiece is machined while being fixed in the first gripping device. Next it is fixed with the machined portion in a second gripping device, after which further machining takes place. In this known method only a limited number of operations is possible on the workpiece in the second gripping device, because of the manner of clamping.

The invention aims at providing a method wherein in a workpiece can simply be provided with a mounting element, with which it can be firmly and accurately fixed, after which nearly the entire workpiece can be machined.

This object is achieved with the device according to the invention in that the first and second gripping devices are located on different sides of a gripping table that is swivelling about a swivel axle, which swivel table is at least swivelling from a first position, in which the workpiece that is fixed in the first gripping device can be machined for making in the workpiece the element that comprises a dovetail-shaped mounting element, towards a second position in which the workpiece that is fixed in the second gripping device by means of the dovetail-shaped mounting element can be machined, and vice versa.

By swivelling the gripping table the first or the second gripping device can easily be put in a position where the workpiece fixed in the relevant gripping device can be machined. Such machining may e. g. be a metal-removing operation, like cutting, drilling etc.

In this way it is possible with one and the same machining device to make the dovetail-shaped mounting element in the workpiece, as well as to carry out further operations to the workpiece.

The first gripping device is suited for holding the workpiece is such a way that the dovetail-shaped mounting element can be made in the workpiece. During this procedure the workpiece can be fixed along nearly its complete circumference, if desired. The workpiece provided with the dovetail-shaped mounting element can consequently be positioned in the second gripping device, and be further machined. Interim storage of the workpieces provided with the dovetail-shaped mounting element is not necessary in the method according to the invention. The advantage of fixing the workpiece with a dovetail-shaped mounting element is that the dovetail-shaped mounting element is just located on only one side of the workpiece, so that the remaining sides are easily accessible and can thus be machined. Moreover a good fixation is achieved by means of a dovetail-shaped mounting element.

Because of the dovetail-shaped mounting element a very stable and accurately positioned attachment is achieved. Herewith only a minimal amount of material needs to be removed, so that the machining time is short and a relatively small base material may be chosen, especially as regards cylindrical material. The entirety of the gripping devices with the dovetail-shaped mounting element facilitate an efficient and reliable automated machining process, which can be carried out unmanned on e. g. a 5-axled machine tool. An instance of such per se known 5-axled machine tool is a 5-axled cutting tool.

As the first and second gripping devices are located on different sides of a gripping table that is swivelling about a swivel axle, each gripping device can be easily positioned with respect to the machining tool.

It should be noted that in the method known from the U.S. Pat. No. 5,582,297 a component to be formed in the workpiece is used as a mounting element. Therefore no optimal fixation is guaranteed. As moreover in the arrangement according to the U.S. Pat. No. 5,582,297 the gripping devices are positioned stationary, the one gripping device may obstruct the machining of the workpiece that is fixed in the other gripping device. Since in the method according to the invention the gripping devices are located on a gripping table that is swivelling about a swivel axle, it is possible to direct the workpiece clamped with the dovetail-shaped mounting element towards the tool, while the first gripping device does not obstruct the machining of the workpiece by means of the tool.

Furthermore it should be noted that usually with a separate device mounting elements are made in a number of workpieces, after which the workpieces are stored. As soon as one wishes to machine the workpiece further, the workpiece needs to be collected from storage, after which it can simply be mounted in the machining device by means of the mounting element. As long as the workpiece is not provided with a mounting element, the workpiece cannot be fixed onto the known machining device, unless the gripping device is replaced. Replacement of gripping devices is time-consuming and undesirable, certainly in the case of automated machining devices. An employee is required for replacing gripping devices. The subsequent making of the dovetail-shaped mounting element takes a relatively short time, which means that in the meantime the employee can do nothing else but wait until the gripping device needs replacing again.

By means of the method according to the invention the dovetail-shaped mounting element can be made in the workpiece fully automatically in the machining device, the workpiece provided with the dovetail-shaped mounting element can be fixed by means of the dovetail-shaped mounting element and can subsequently be machined.

An embodiment of the device according to the invention is characterized in that by means of a gripper the workpiece is positioned in the first and/or second gripping device, and/or is removed from the same.

By such gripper an automated collecting from storage of a workpiece to be machined is possible, as well as the transfer of the workpiece of the first gripping device to the second gripping device and the subsequent removal of the machined workpiece from the second gripping device and the transfer to another storage.

The invention further relates to a machining device that is characterized in that the machining device is provided with at least one tool for making the element comprising a dovetail-shaped mounting element in the workpiece that is fixed in the first gripping device, the first and second gripping devices being located on different sides of a gripping table that is swivelling about a swivel axle, which gripping table is at least swivelling from a first position, in which the workpiece can be machined for making the dovetail-shaped mounting element in the workpiece, towards a second position in which the workpiece that is fixed in the second gripping device by means of the dovetail-shaped mounting element can be machined with the tool, and vice versa.

By such machining device an efficient machining of a workpiece becomes possible, because of which the machining device is suited for small series of workpieces to be machined, without the necessity of interim storage of the workpieces en/or replacements of gripping devices.

An embodiment of the machining device according to the invention is characterized in that the machining device is provided with different first gripping devices, which are respectively suited for fixing an cross cut side and a longitudinal side of a cylindrical workpiece.

Hereby the cylindrical workpiece to be machined can be made in the cross cut side or the longitudinal side, according to preference.

Another embodiment of the machining device according to the invention is characterized in that the first gripping device is provided with a recess that is limited by at least two abutment surfaces including an angle with one another, as well as gripping surface that is movable with respect to the abutment surfaces. Preferably the abutment surfaces and the gripping surface include herewith an angle of about 60° with one another.

Such gripping device is particularly suited for fixing end cross cut sides of a cylindrical workpiece, in which case workpieces with different diameters can simply be fixed because of the movable gripping surface. By the angle of about 60° the contact points of the abutment surfaces and the gripping surface with the workpiece will be regularly distributed along the circumference of the workpiece.

Yet another embodiment of the machining device according to the invention is characterized in that the first gripping device comprises a central portion and two gripping parts located on both sides of the central portion, each being separately movable from the central portion and towards the central portion. Preferably the central portion and the gripping part comprise gripping surfaces that include an angle of about 30° with one another.

Such gripping device is particularly suited for fixing the longitudinal side of a cylindrical workpiece, the gripping surfaces preferably extending past the centre of the workpiece.

The invention will be described in further detail with reference to the drawings, in which.

In the figures like parts are referred to by like reference numbers.

Figure 1:
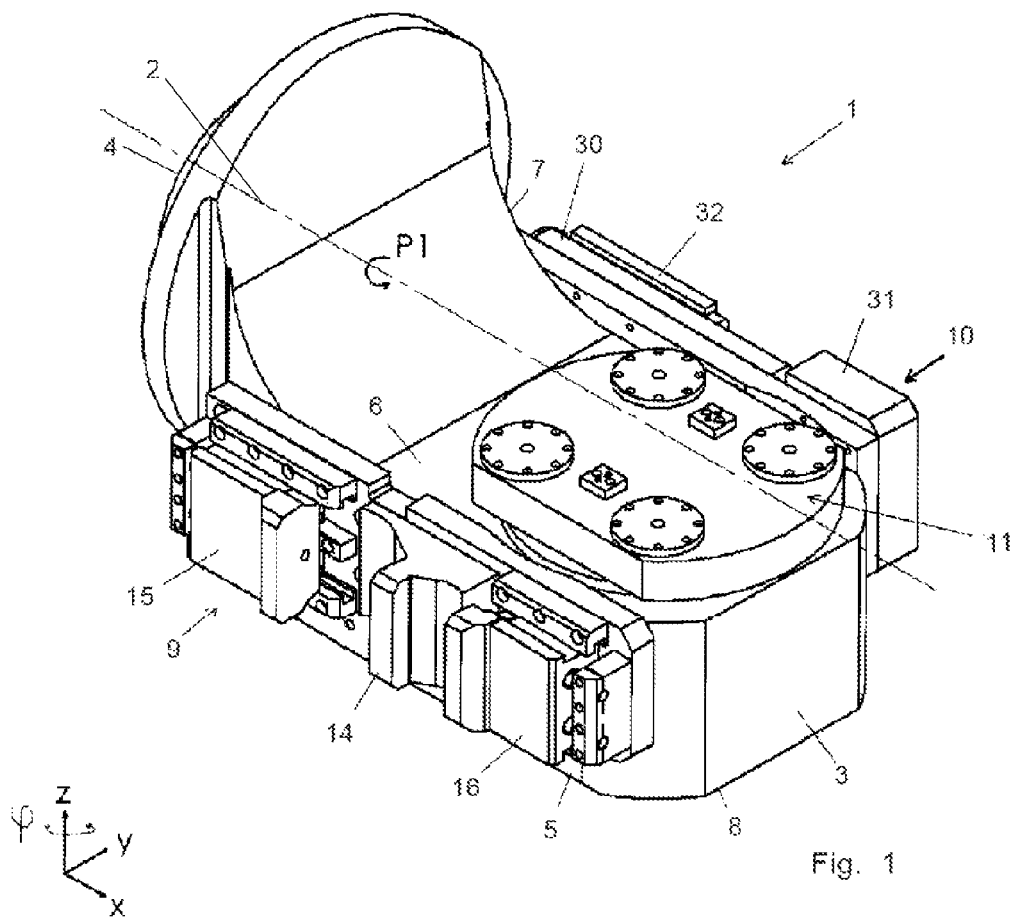
FIG. 1 shows a perspective view of an embodiment of a gripping table of a machining device according to the invention.

FIG. 1 shows a perspective view of a gripping table 1 of a machining device according to the invention. The gripping table 1 bearing-mounted in the machining device, is swivelling about a swivel axle 2, by which the gripping table 1 is swivelling in, and opposite to, the direction indicated by arrow P1. The machining device further includes at least one machining unit, such as a cutter, a drill etc. and means for moving the machining unit with respect to the X-, Y-, Z- and φ-directions of the gripping table 1. Such machining device, by which movements in five directions can be performed, is called a 5-axle machining device. A 5-axle machining device is known per se and is therefore not shown and its operation will therefore not be explained in further detail.

The gripping table 1 of the machining device according to the invention comprises a frame 3 that at one end is provided with a main axis 4, by means of which the gripping table 1 is bearing-mounted in the machining device and can be driven to be rotated in, or opposite to, the direction indicated by the arrow P1.

The frame 3 comprises four sides 5, 6, 7, 8 that extend parallel to the swivel axle 2. The parallel extending sides 5, 7 are each provided with a gripping device 9, 10, that is respectively suited for fixing a longitudinal side and an cross cut side of a cylindrical workpiece (see FIGS. 7 and 8). Side 6 is provided with a clamping unit 11, which is suited for clamping a gripping device 12 (see FIGS. 7 and 8). The clamping unit 11 is rotatable about a rotation axle extending transversely to the side 6 and the swivel axle 2.

Figure 2:
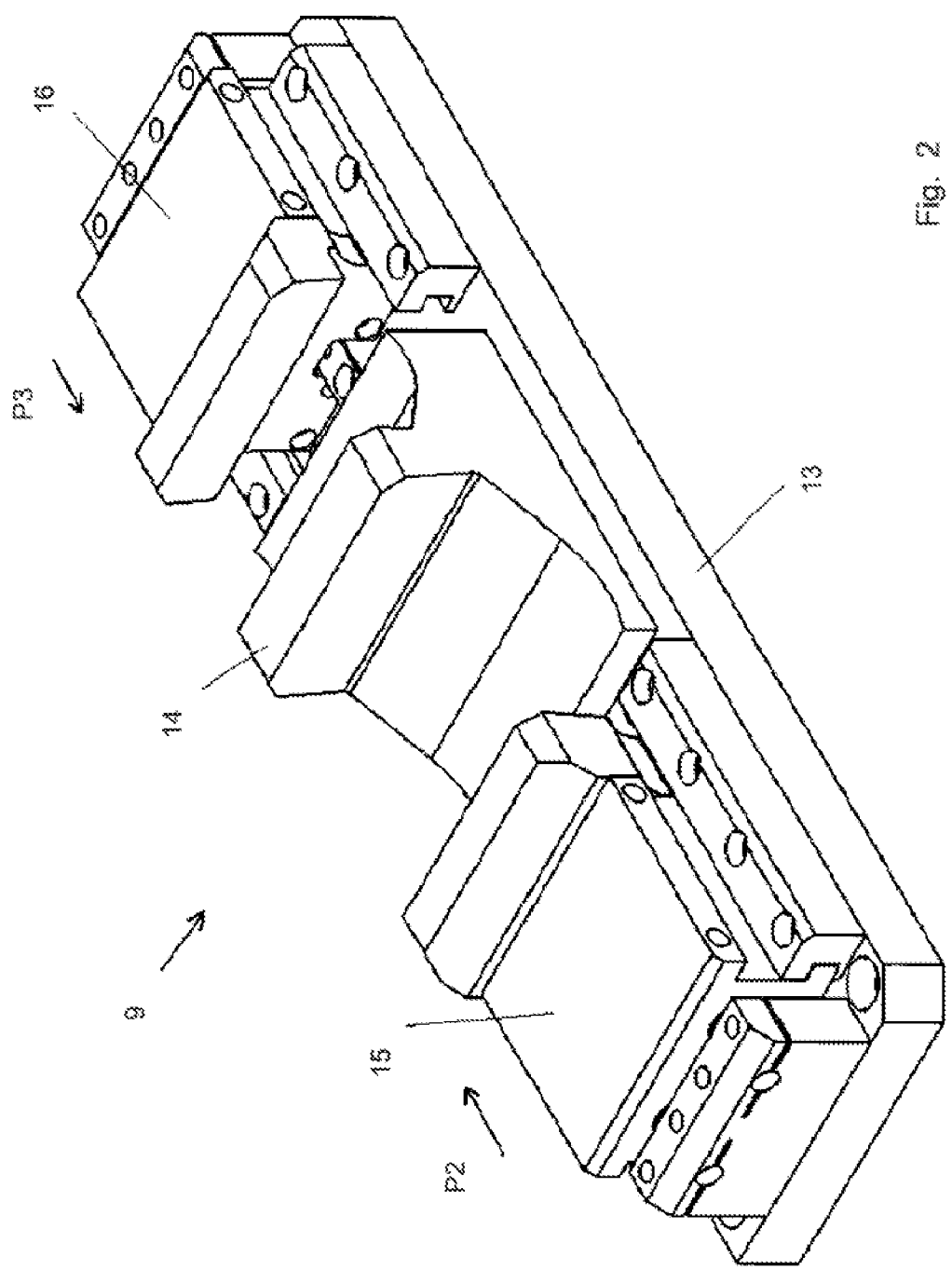
FIG. 2 shows a perspective view of a first embodiment of a first gripping device according to the gripping table illustrated in FIG. 1.
Figure 3:
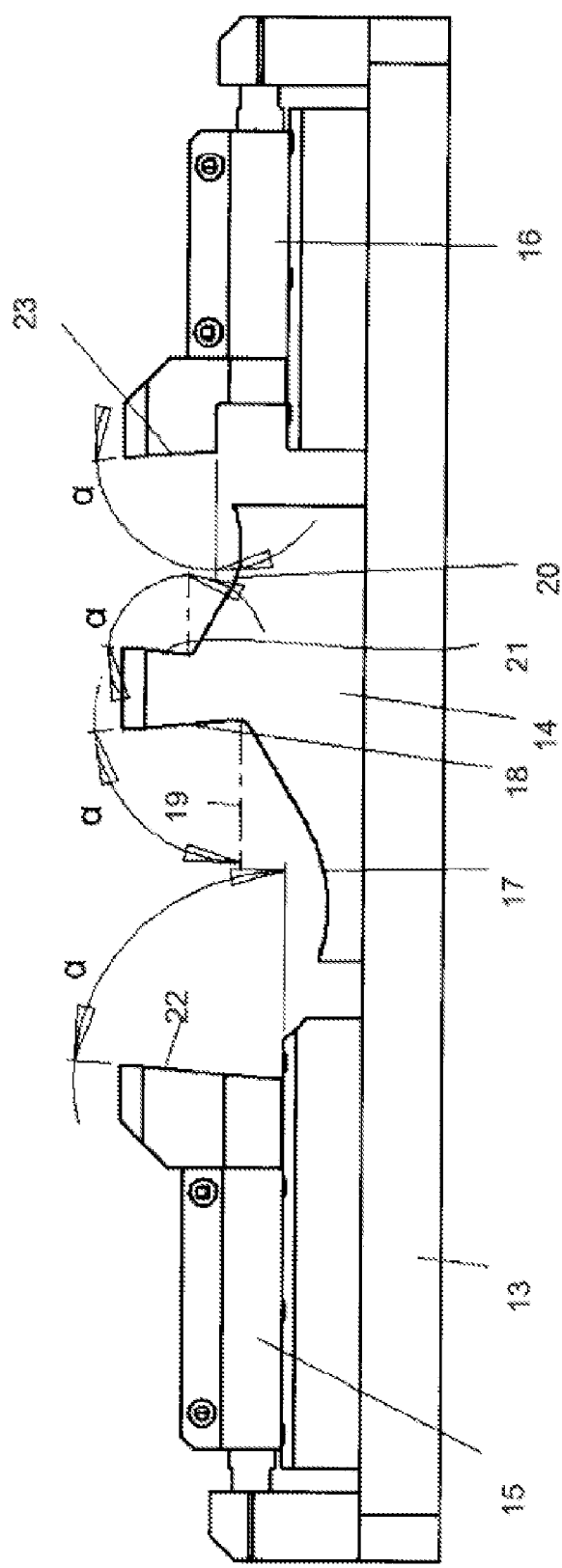
FIG. 3 shows a side view of the gripping device illustrated in FIG. 2.
Figure 4:
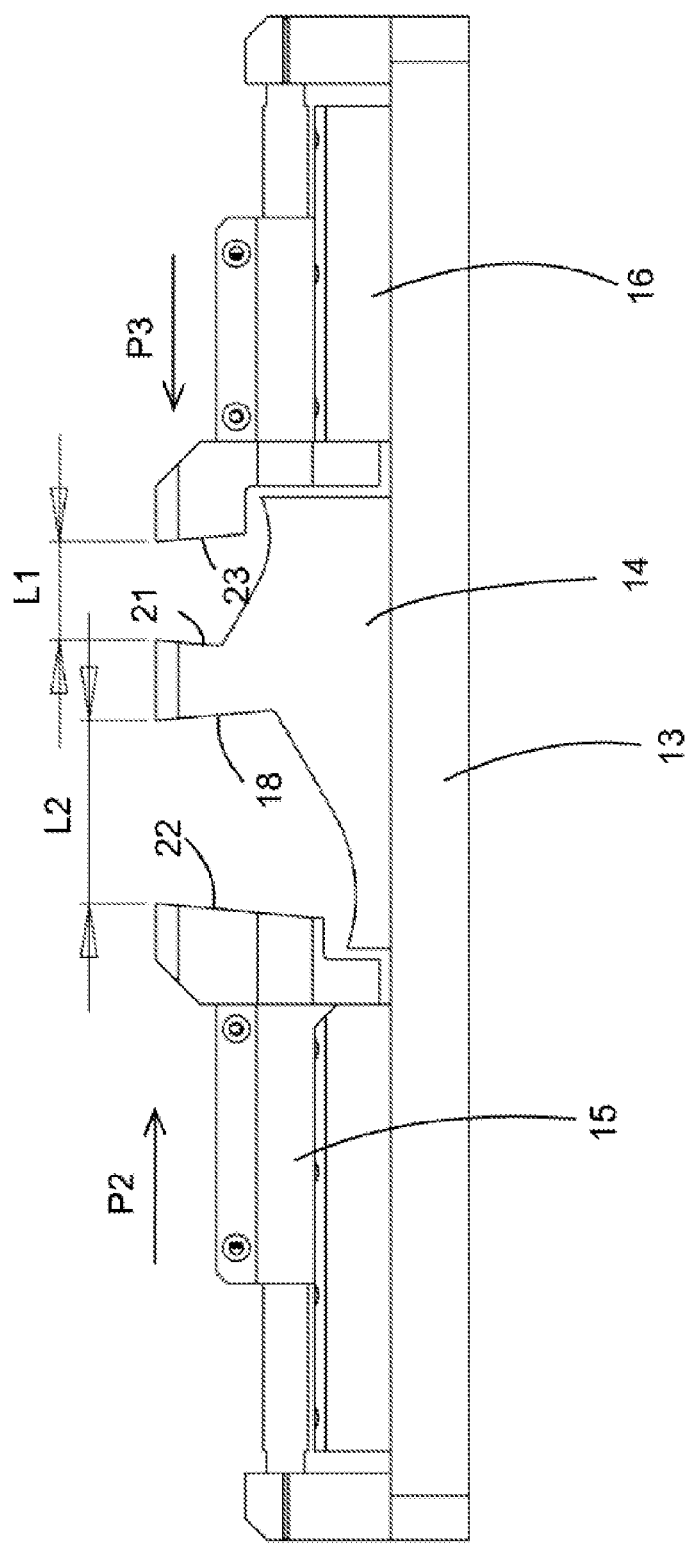
FIG. 4 shows a side view of the gripping device illustrated in FIG. 2, in a different gripping position.

FIGS. 2-4 show various views of the gripping device 9 that is detachably connected to the side 5 of the frame 3. The gripping device 9 comprises a bottom plate 13, a central portion 14, centrally connected to the bottom plate, and gripping parts 15, 16, which are located on both sides of the central portion 14. On one side that is turned towards the gripping part 15, the central portion 14 is provided with a curved supporting surface 17 and an abutting gripping surface 18 that inclines in the direction of gripping part 15. The gripping surface 18 includes an angle α with the horizontal 19. The supporting surface 17 includes an angle of 110-120° with the gripping surface 18. On one side that is turned towards the gripping part 16, the central portion 14 is provided with a curved supporting surface 20 and an abutting gripping surface 21 that inclines in the direction of gripping part 16. The gripping surface 21 includes an angle α with the horizontal 19. The curved supporting surface 17 of the gripping part 15 is situated closer to the bottom plate 13 than the curved supporting surface 20 of the gripping part 16. Due to the curvature of the curved supporting surfaces 17, 20 the range of the gripping device 9 is relatively large. The gripping parts 15, 16 are each provided with respectively gripping surface 22, 23 inclining in the direction of the central portion 14. The gripping surfaces 22, 23 include an angle α with the horizontal 19. The angle α is preferably 75° tot 88° and more preferably 85°. The gripping part 15 is movable with respect to the central portion 14 in, and opposite to, the direction indicated by arrow P2. The distance L2 between the gripping surfaces 18, 22 is herewith e. g. adjustable between 80 and 160 mm. The gripping part 16 is movable with respect to the central portion 14 in, and opposite to, the direction indicated by arrow P3. The distance L1 between the gripping surfaces 21, 23 is herewith e. g. adjustable between 40 and 100 mm.

The gripping part 15 in cooperation with the central portion 14 is suited for fixing longitudinal sides of cylindrical workpieces with a diameter of e. g. 90 to 150 mm, whereas the gripping part 16 in cooperation with the central portion 14 is suited for fixing longitudinal sides of cylindrical workpieces with a diameter of e. g. 50 to 90 mm.

Figure 5:
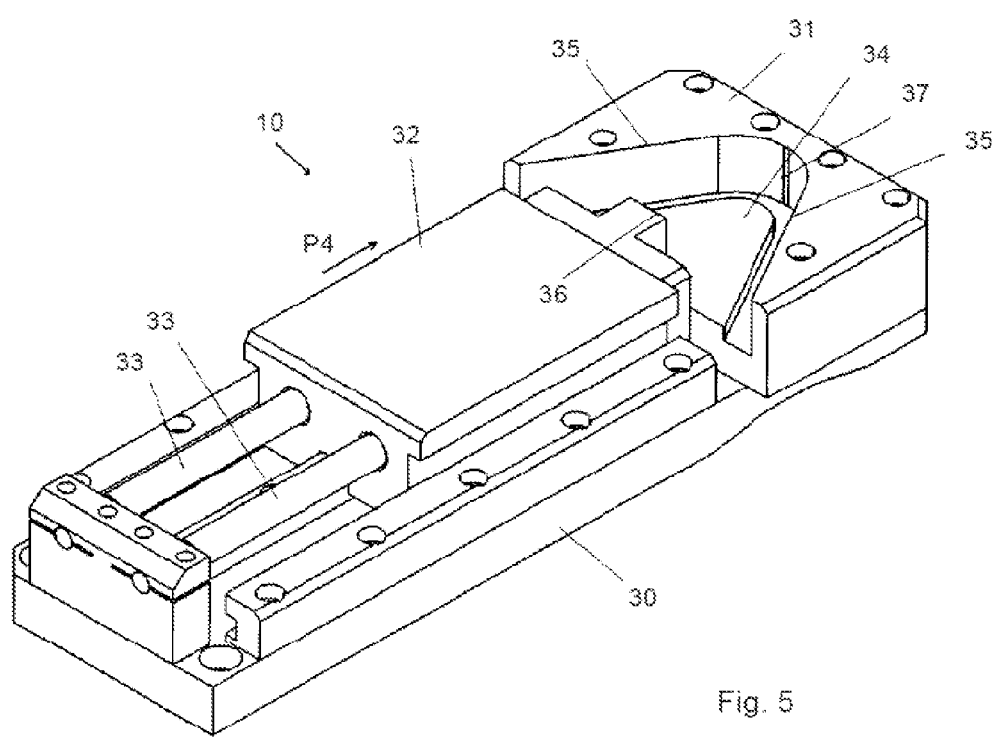
FIG. 5 shows a perspective view of a second embodiment of a first gripping device of the gripping device illustrated in FIG. 1.
Figure 6:
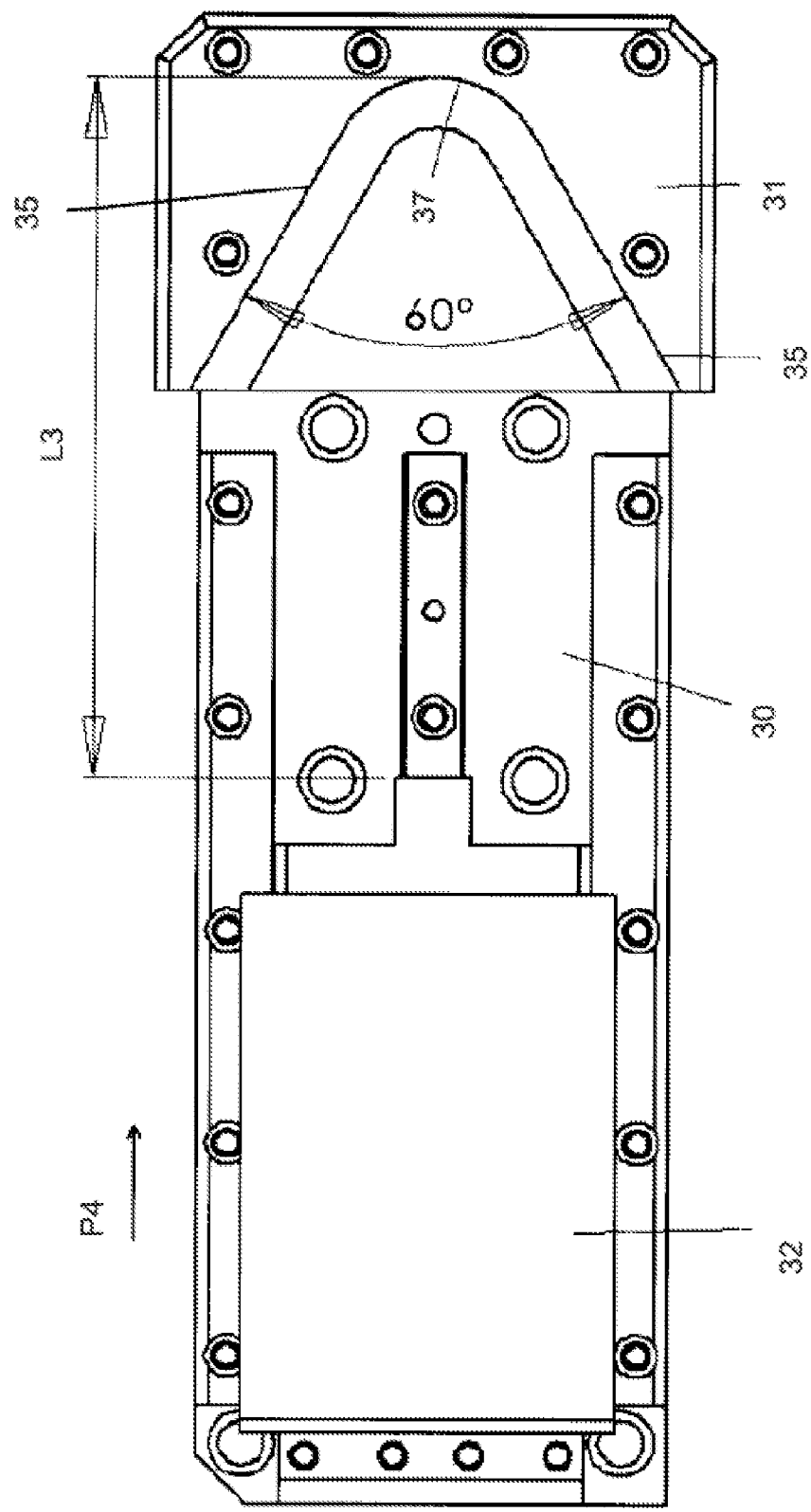
FIG. 6 shows a plan view of the gripping device illustrated in FIG. 5.

FIGS. 5 and 6 show views of the gripping device 10 that is detachably connected to the side 7 of the frame 3. The gripping device 10 comprises a bottom plate 30, an abutment part 31 that is connected to the bottom plate 30 and a gripping part 32 that is slidable with respect to the abutment part 31 in, and opposite to, the direction indicated by arrow P4. The gripping part 32 is slidably bearing-mounted over piston rods 33, and is movable by means of a hydraulic drive (not illustrated). The abutment part 31 comprises a recess 34 that is limited by at least two abutment surfaces 35 including an angle of 60° with one another. On one side that is turned towards the recess 34, the gripping part 32 comprises a gripping surface 36 that is located centrally with respect to the abutment surfaces 35. The gripping surface 36 preferably includes an angle of preferably 60° with the abutment surfaces 35. The gripping surface 36 is movable with respect to the abutment surfaces 35, the distance L3 between the gripping surface 36 and point 37 of the recess 34 that is most remote from the gripping surface 37 being adjustable to hold workpieces with a diameter of between 40 and 200 mm, for example.

Figure 7:
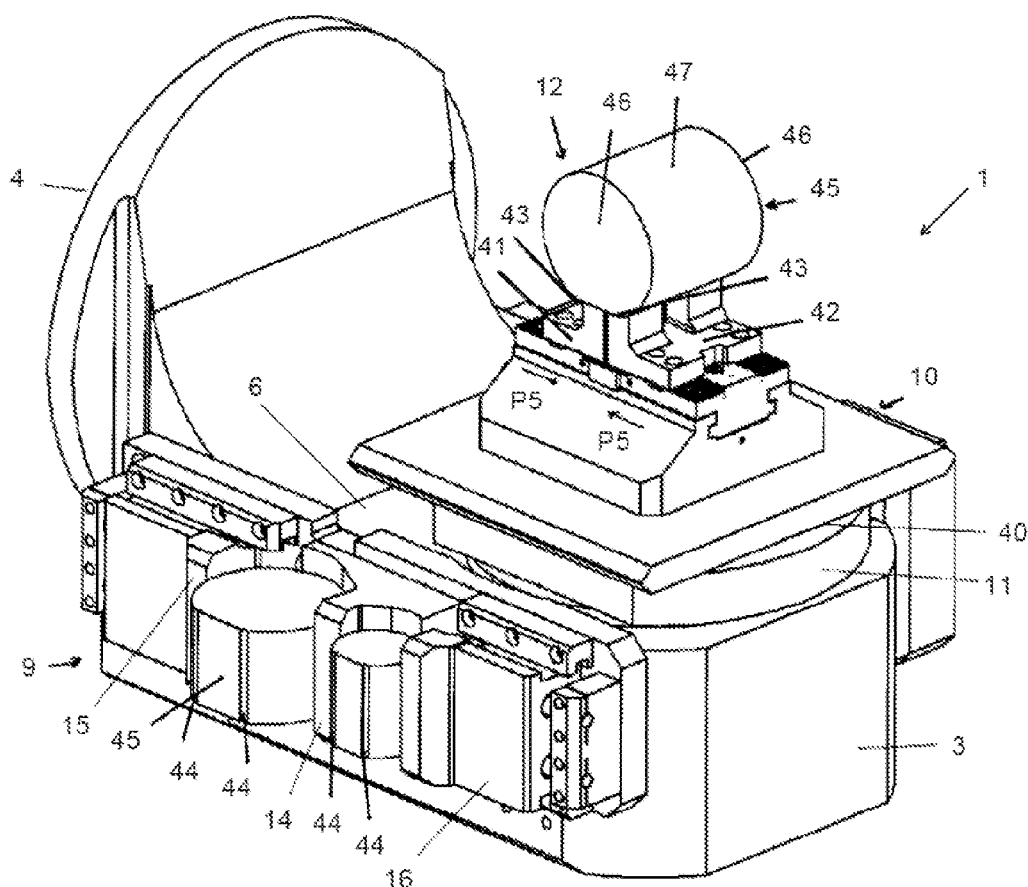
FIG. 7 shows a perspective view of the gripping table illustrated in FIG. 1, which is provided with a second gripping device, in which workpieces are fixed in the first and second gripping devices.
Figure 8:
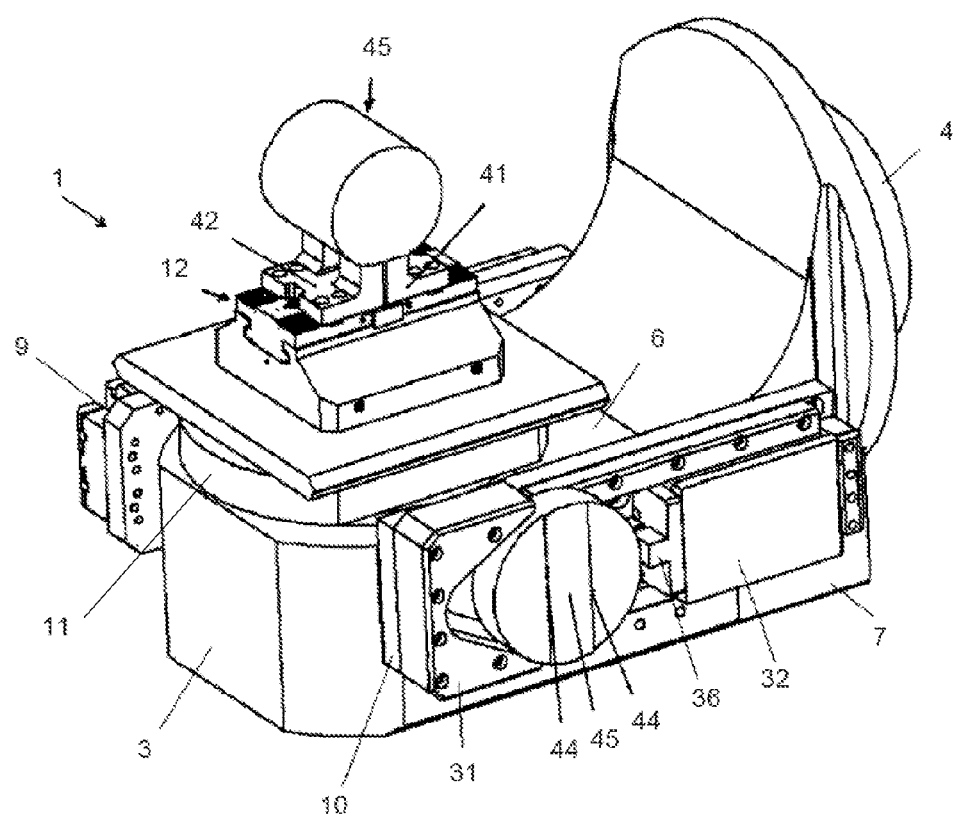
FIG. 8 shows another perspective view of the gripping table illustrated in FIG. 7.

FIGS. 7 and 8 show views of the gripping table 1. Side 6 is provided with the clamping unit 11, on which the gripping device 12 is detachably mounted. The gripping device 12 comprises a bottom plate 40, as well as two gripping parts 41, 42 that are movably connected to the bottom plate 40 in, and opposite to, directions indicated by arrow P5. The gripping parts 41, 42 are provided with gripping edges 43 that are apt to be brought into grip with a dovetail-shaped mounting element 44 on a workpiece 45. Such gripping parts 41, 42 are known per se.

The operation of the machining device according to the invention is as follows. By means of a gripper (not illustrated) a workpiece 45 to be machined, like e. g. a cylindrical workpiece 45, is lifted. If at the cross cut side 46 of the workpiece 45 a dovetail-shaped mounting element 44 needs to be made, the workpiece 45 is moved to the gripping device 10, while the end of the workpiece 45 that is averted from the cross cut side 46 is positioned in the recess 34 against the abutment surfaces 35. Subsequently the gripping surface 36 is pressed against the longitudinal side 47 of the workpiece 45, due to which the workpiece 45 is fixed firmly between the abutment surfaces 35 and the gripping surface 36. If in the longitudinal side 47 of the workpiece a dovetail-shaped mounting element 44 needs to be made, the workpiece 45 is moved to the gripping device 9. Dependent on the diameter of the workpiece 45, the workpiece 45 is positioned between the central portion 14 and the gripping part 15 or the gripping part 16. Then the gripping part 15, 16 is moved to the central portion 14, the workpiece being firmly fixed between the supporting surface 17; 20 and the gripping surfaces 18, 22; 21, 23.

It is also possible to position workpieces 45 with different diameters next to one another in the gripping device 9.

Figure 9:
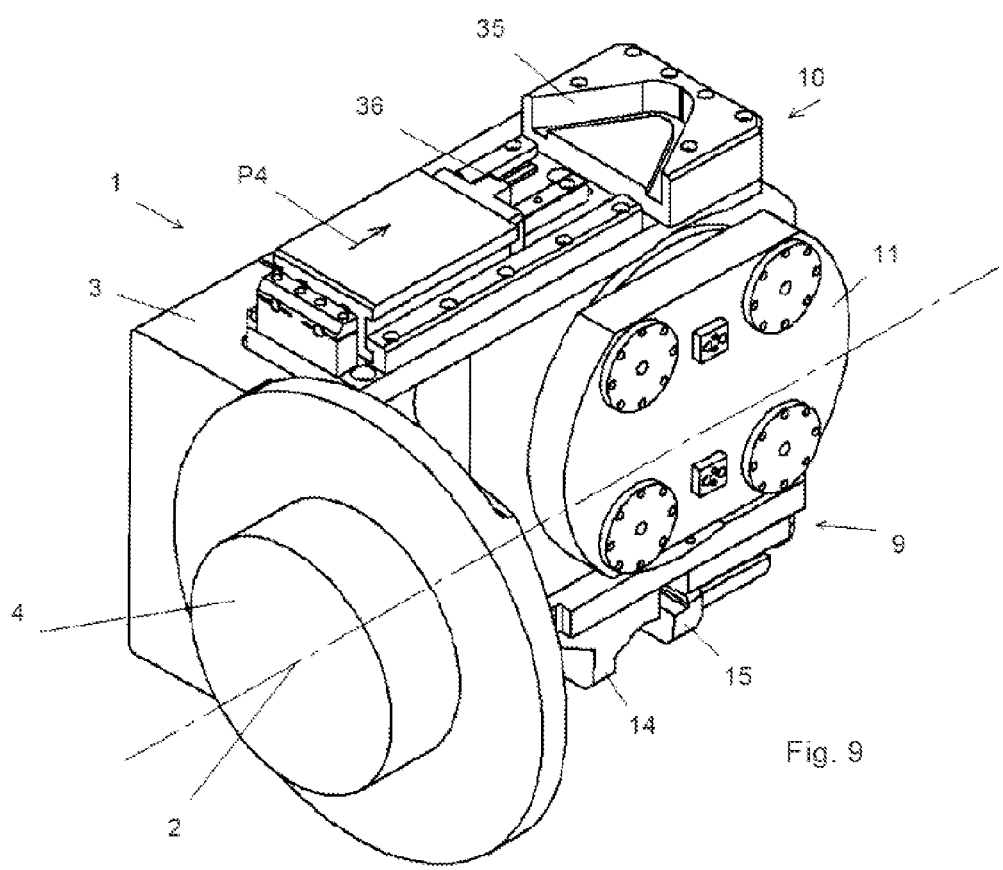
FIG. 9 shows the gripping table illustrated in FIG. 1, where the gripping table is swiveled over 90°.

Subsequently the gripping table 1 is swiveled about the swivel axle 2, as e. g. is illustrated in FIG. 9, where the gripping device 9, 10 with the workpiece 45, that is provided with a mounting element 45, is directed towards the machining unit of the machining device. In order to make a dovetail-shaped mounting element 44 an adequate cutter will be used here.

After dovetail-shaped mounting elements 44 have been made in the workpiece 45, the workpiece 45 is lifted from the gripper device 9, 10 by means of the gripper, and is moved tot the gripping device 12. Here the workpiece 45 is fixed between the gripping parts 41, 42 by means of the dovetail-shaped mounting elements 44. The gripping table 1 is swiveled once more, so that the workpiece 45 that is fixed in the gripping device 12 can be machined.

The gripping devices 9, 10 form first gripping devices that are suited for fixing a workpiece that is not yet provided with a mounting element. If desired it is also possible to provide such first gripping device to side 8 extending parallel to side 6, which e. g. is suited for fixing rectangular workpieces.

The gripping in the first gripping device can also take place in another way like e. g. by means of magnetic power.

It is also possible to mount bearings on both sides of the rotatable frame 3.

The invention claimed is:

1. Method for machining a workpiece,
    wherein the workpiece is fixed in a first gripping device of a machining device for making at least one element,
    after which the workpiece is transferred to a second gripping device of said machining device,
    wherein the workpiece is fixed in the second gripping device of the machining device by said element, while the first gripping device remains connected to the machining device, characterized in that
    said first and second gripping devices being located on different sides of a gripping table that is swiveling about a swivel axle between at least a first position and a second position,
    wherein in said first position the element that comprises a dovetail-shaped mounting element is being made in the workpiece that is fixed in the first gripping device,
    whilst in said second position the workpiece that is fixed in the second gripping device by the dovetail-shaped mounting element is being machined.

2. Method according to claim 1, characterized in that a gripper is being used to position said workpiece in and remove said workpiece from said first gripping device and said second gripping device.

3. Method according to claim 1, characterized in that the machining to be carried out on the workpiece is a metal-removing operation.

4. Method according to claim 1, characterized in that the workpiece is cylindrical, wherein the dovetail-shaped mounting element is made in an cross cut side of the cylindrical workpiece.

5. Method according to claim 1, characterized in that the workpiece is cylindrical, wherein the dovetail-shaped mounting element is made in a longitudinal side of the cylindrical workpiece.

6. Method according to claim 1, characterized in that the machining device is provided with at least one cutter for cutting the dovetail-shaped mounting element into the workpiece.

7. Machining device for machining a workpiece, which machining device is provided with:
    at least a first gripping device that is suited for fixing a workpiece that is to be provided with an element,
    a second gripping device that is suited for fixing the workpiece by means of said element, characterized in that
    said machining device is provided with at least one tool for making the element comprising a dovetail-shaped mounting element in the workpiece fixed in the first gripping device,
    said first and second gripping devices being located on different sides of a gripping table, said gripping table is swiveling about a swivel axle between at least a first position and a second position, wherein in said first position, the workpiece that is fixed in the first gripping device can be machined for making in the workpiece the element that comprises a dovetail-shaped mounting element, whilst in said second position the workpiece that is fixed in the second gripping device by the dovetail-shaped mounting element can be machined, characterized in that the first gripping device is provided with a recess that is limited by at least two abutment surfaces including an angle with one another, as well as a gripping surface that is movable with respect to the abutment surfaces.

8. Machining device according to claim 7, characterized in that the machining device is provided with at least one tool comprising a cutter for cutting the dovetail-shaped mounting element into the workpiece.

9. Machining device according to claim 7, characterized in that the machining device is provided with different first gripping devices, which are respectively suited for fixing a cross cut side and a longitudinal side of a cylindrical workpiece.

10. Machining device according to claim 7, characterized in that the abutment surfaces and the gripping surface include an angle of about 60° with one another.

11. Machining device according to claim 7, characterized in that the first gripping device comprises a central portion and two gripping parts located on both sides of the central portion, each being separately movable from the central portion and towards the central portion.

12. Machining device according to claim 11, characterized in that the central portion and the gripping part comprise gripping surfaces that include an angle of about 30° with one another.

13. Machining device according to claim 7, characterized in that by means of the machining device at least metal-removing operations can be carried out.

14. Method for machining a workpiece comprising, providing a machining device comprising a gripping table operable to swivel about a swivel axis between a first position for machining a workpiece on a first side of the gripping table and a second position for machining the workpiece on a second side of the gripping table, providing a first gripping device on the first side of the gripping table, providing a second gripping device on the second side of the gripping table, gripping a workpiece in the first gripping device of the machining device, machining the workpiece in the first gripping device while the gripping device is in the first position to from a dovetail-shaped element, gripping the element in the second gripping device of the machining device, swiveling the gripping table about the swivel axis, and machining the workpiece in the second gripping device while the gripping device is in the second position of the machining device while the first gripping device remains connected to the machining device.

15. An apparatus for machining a workpiece comprising, a 5axle machining device comprising a gripping table operable to swivel about a swivel axis between a first position for machining a workpiece on a first side of the gripping table and a second position for machining the workpiece on a second side of the gripping table, a first gripping device on the first side of the gripping table and operable to grip a workpiece to be machined, a first tool coupled to the 5-axle machining device and operable to machine the workpiece in the first gripping device while it is in the first position and wherein the first tool is operable to machine the workpiece to form an element, a second gripping device on the second side of the gripping table and operable to grip the element, and a second tool coupled to the machining device and operable to machine the workpiece in the second gripping device while it is in the second position and while the first gripping device remains connected to the machining device.

16. The apparatus according to claim 15, wherein the element is dovetail-shaped.

* * * * *